United States Patent [19]
Siebel

[11] 3,820,757
[45] June 28, 1974

[54] COAXIAL VALVE
[76] Inventor: John E. Siebel, 5563 W. Washington Blvd., Santa Monica, Calif. 90016
[22] Filed: July 3, 1972
[21] Appl. No.: 268,760

[52] U.S. Cl. .................................................. 251/139
[51] Int. Cl. ........................................... F16k 31/02
[58] Field of Search.................. 251/129, 139, 322; 137/234.5; 335/281

[56] References Cited
UNITED STATES PATENTS

| | | | |
|---|---|---|---|
| 1,829,556 | 10/1931 | Crowley | 251/322 X |
| 1,917,499 | 7/1933 | Conrad | 251/322 X |
| 2,863,473 | 12/1958 | Gantz | 251/139 X |
| 2,889,109 | 6/1959 | O'Brien | 137/625.65 UX |
| 2,965,350 | 12/1960 | Knaebel et al. | 251/129 X |
| 3,022,799 | 2/1962 | Padula | 251/139 X |
| 3,198,404 | 8/1965 | Welches | 251/139 X |
| 3,447,776 | 6/1969 | Blumer | 251/139 X |
| 3,592,228 | 7/1971 | Kukuminato et al. | 251/139 X |
| 3,592,438 | 7/1971 | Greenwood et al. | 251/139 X |
| 3,687,216 | 8/1972 | Tracy | 251/139 X |
| 3,712,328 | 1/1973 | McAnally | 137/234.5 |

Primary Examiner—Alan Cohan
Attorney, Agent, or Firm—Jack D. Puffer

[57] ABSTRACT

A compact solenoid valve having a mass produced valve assembly similar to that used as the valve core in vehicle tires and like applications and further having a minimum number of parts for ease of assembly and economy of manufacture.

2 Claims, 3 Drawing Figures

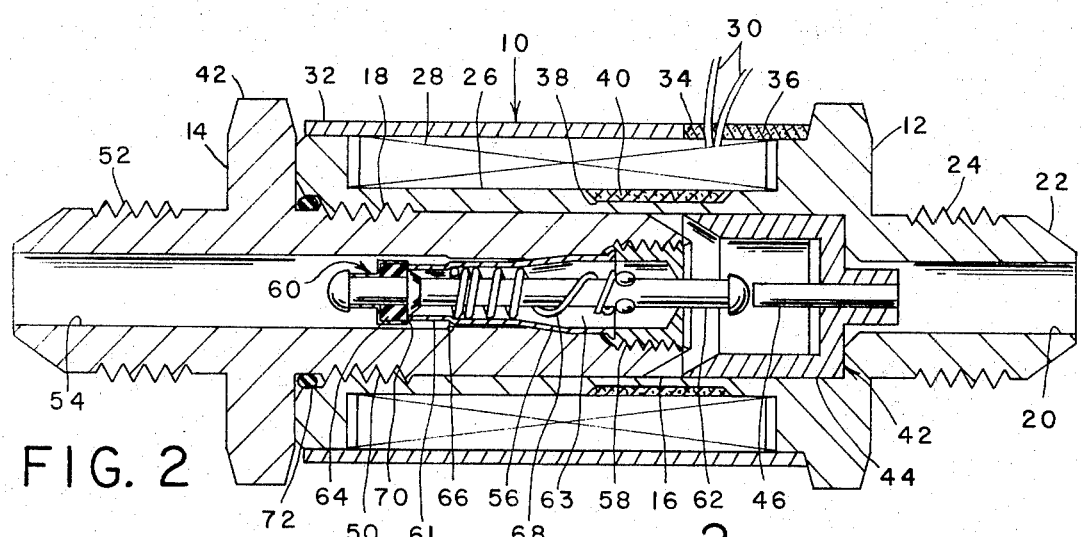
FIG. 2
FIG. 1
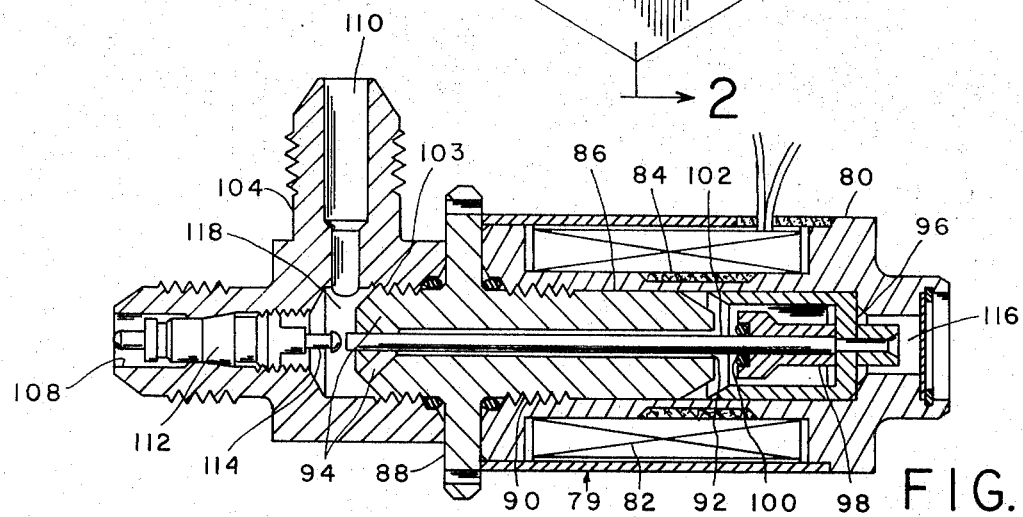
FIG. 3

3,820,757

COAXIAL VALVE

BACKGROUND OF THE INVENTION

This invention relates to valve mechanisms and in particular to solenoid valves having a valving assembly actuated by a solenoid actuating mechanism.

Small valves of this general type have previously been relatively expensive to manufacture because of the need for precision machining to obtain a surface finish and tolerance between mating parts so as to provide low leakage across the valve's sealing parts. In addition, the electro-magnetic solenoid required that the solenoid coil be wound on a nonmagnetic material and that end caps of iron or other magnetically permeable material be provided at the end of the coil. Thus the body of the valve has, of necessity, been made of several parts of different materials which adds to the overall cost of the valve.

SUMMARY OF THE INVENTION

In accordance with the instant invention these difficulties and shortcomings are overcome by providing a valving assembly made from parts readily produced on automatic machines and available at a nominal cost. In addition there is provided a solenoid assembly requiring a minimum number of parts which can all be made from the same material and from standard material forms. Since the valve contains fewer parts, assembly and calibration time is minimized thus further reducing the manufacturing cost.

An object of the invention is to provide a valve assembly which is easily produced having a minimum number of parts.

Another object of this invention is to produce a solenoid valve having a unique magnetic assembly for valve actuation.

It is another object of the invention to provide a coaxial valve of simple construction using inexpensive, reliable components.

It is yet another object of this invention to provide a three-way solenoid valve which can be inexpensively produced yet having precision sealing parts.

These and other objects of this invention will appear from the following description thereof wherein reference is made to the figures of the accompanying drawings.

DESCRIPTION OF THE DRAWINGS

In the drawings:

FIG. 1 is an end view of one embodiment of the invention.

FIG. 2 is a sectional view of the invention taken along line 2—2 of FIG. 1.

FIG. 3 is a partial sectional view of another embodiment of the invention.

DESCRIPTION OF THE PREFERRED EMBODIMENT

Referring now to FIG. 2 there is shown a coaxial valve assembly 10 having a body member 12 and a stop member 14. Body member 12 has a central bore 16 which contains internal threads 18 at one end. At the other end of the body 10 is a reduced bore 20 which serves as the exit opening for the valved fluid. At the exit end there is provided a fitting 22 having threads 24 for assembling the valve in a fluid system.

On the exterior surface of the body member there is a reduced diameter 26 running along a substantial portion of the body length. Wound upon this reduced portion is the solenoid winding 28 having leads 30 for connection to a source of electrical power (not shown). Covering the winding 28 is a cover member 32 which is provided with an opening 34 for the exit of leads 30. The opening 34 is sealed with an epoxy or other suitable sealant as shown as 36. Along the reduced diameter 26 is a second reduced portion 38 filled with a dielectric material 40 which runs a short distance along the body near the exit end thereof for providing flux path restriction.

Slideably mounted within the bore 16 of the body member is a plunger assembly 42 made up of a plunger 44 and a rod 46.

The stop member 14 has a collar portion and is threaded at 50 to mate with threads 18 on the body. At the other end threads 52 are provided for a standard fluid coupling. The stop is also provided with a central bore 54 which has a tapered portion 56 and internal threads 58. Fitted within this bore and attached by threads 58 is a valving assembly 60.

The valving assembly is comprised of a shell 61 having a central opening 63 through which passes a valve rod 62. Attached to the valve rod is a spring 68 and at the other end, a sealing member 64. The spring 68 is fastened to the rod 62 at one end and is seated against internal shoulder 66 at the other end. The spring serves to force sealing member 64 against edge 70 of the shell to form the valve seat. To insure a fluid tight assembly there is provided a sealing ring 72 between the body and the stop.

OPERATION:

The operation of the valve is as follows:

In the normally closed position, fluid introduced into the valve at 54 is prevented from flowing through the valve by the valving member 60. When an electrical signal is applied to the solenoid coil 28, a magnetic circuit is formed from the coil through the end of the body, then through the plunger 42 and returned through the ends of the stop and the coil cover 32. The magnetic force causes the plunger 42 to move toward the stop member 14 and to engage the valve rod 62. Movement of the valve rod causes the seal member 64 to move away from the edge 70 of the valve shell 61 thus providing a fluid path from opening 54 in the stop, through the shell 61 and out the exit bore 20. Upon removal of the electrical signal, spring 68 causes the rod 62 to return toward the body member and reseat member 64 against surface 70.

Referring now to FIG. 3 there is shown another embodiment of the invention. This embodiment comprises a three-way valve having two operational conditions depending upon the excitation of the solenoid. In the first condition fluid is directed from the inlet port to the fluid utilizing mechanism. In the second condition the inlet port is closed and a fluid path is opened allowing fluid from the utilizing mechanism to be exhausted through the valve body.

There is shown in FIG. 3 a three-way valve assembly 79 comprised of a bobbin member 80 on which a solenoid coil 82 is wound and covered in the same manner as described in connection with FIG. 2 above. A similar relieved portion 84 is provided in the bobbin member for restricting the magnetic flux path. Fastened within the central bore 86 of the bobbin is a stop member 88 threaded into the bore 86 at 90. The stop contains a central bore 92 and divergent openings 94 at the other end. Slideably mounted in the bore of the bobbin is a plunger assembly 96 containing poppet 98 with an "O" ring 100 in the end thereof. Also attached to the plunger is an actuating rod 102 extending through the bore of the stop.

Attached to the stop by threads at 103 is a valve housing 104 having a fluid inlet opening 108 and an outlet opening 110. Seated within the opening 108 is a valve assembly 112 having the same component parts as that shown at 60 in FIG. 1. In operation, when the valve is in its normally closed position as shown, fluid from one source connected at opening 110 will flow through the stop member 88 and exit through opening 116 of the bobbin. When the solenoid is energized the plunger assembly moves rod 90 against rod 114 of the valve assembly and opens a path from 108 to chamber 118. As the poppet 98 moves forward with the plunger the "O" ring 100 will seat against the end of the stop and prevent fluid flow through the bobbin. Thus fluid entering 108 will flow into 110 to replenish the supply of fluid in the source connected to 110 (not shown).

As will be recognized by those skilled in the art, the valving assemblies shown at 60 and 112 are like the valve cores commonly found in valve stems of vehicle tires. By utilizing these mass produced reliable valving assemblies in connection with a simple actuating mechanism a highly reliable inexpensive valve may be fabricated for use in medium pressure and flow fluid systems.

What is claimed is:

1. A compact fluid control valve comprising:
a magnetically permeable body member of generally cylindrical shape having a central opening therethrough and having on its outside surface two reduced diameter portions intermediate the ends of said body, said second reduced diameter being of smaller diameter than said first reduced diameter and formed thereon and forming a thin wall portion between said second reduced diameter and the central opening;
said body member including flanges at each end thereof defining the terminal ends of said first reduced diameter portion, said flanges and said reduced diameter portions constituting integrally formed sections of said body member;
a solenoid coil wound on the first reduced outer diameter portion of said body member and overlying the second reduced diameter portion;
a stop member of generally cylindrical shape having a central opening therethrough and attached in the central opening of said body member, the inner end of said stop member extending past the midpoint of said solenoid coil and terminating at a location within said second reduced diameter portion, the central opening of said stop member being in registry with the central opening in said body member, the central opening in said stop member having two diameters of different size connected by a tapered conical section;
a valving assembly comprising:
a thin malleable shell of two different outside diameters connected by a tapered conical section, said shell having a central passage therethrough and being attached in the central opening of said stop member such that:
the conical portion thereof is in engagement with the conical portion of the central opening in said stop member,
the central passage of said shell is concentric with the central opening in said stop member, and
said shell terminates at one end within said second reduced diameter portion and is there threadedly connected to the terminal end of said stop member, the other end of said shell forming a valve seat;
a valve rod slidably mounted in the central passage of said shell, said valve rod projecting from the ends of said shell, substantially all of said valve rod being disposed within said first diameter portion of said body member;
a sealing member attached to an end of said valve rod adjacent said valve seat and being engageable with said valve seat to close the central passage of said shell;
a spring engageable between said shell and said valve rod to bias said sealing member against said valve seat;
an actuating member slidably mounted in said central opening adjacent said one end of said shell, said actuating member comprising:
a solenoid armature engageable with the inner wall of said central opening and defining an inner recess, said armature being located such that the inner end thereof faces the inner end of said stop member and is disposed within the second reduced diameter portion when said solenoid armature is in an unenergized condition; and
an actuating rod portion disposed in said recess in alignment with said valve rod, with said valve rod extending into said recess and terminating short of said actuating rod portion during said unenergized condition;
the inner end of said stop member being champhered to an external conical shape and the inner end of the armature facing the inner end of the stop member being formed with an internal complementary conical shape, there being a gap between said champhered ends during said unenergized condition;
the thin wall portion of said body member forming a flux resistant section in said magnetically permeable body member causing flux generated by the energized solenoid coil to move said actuating member and its actuating rod portion toward said valve rod for opening said seating member such that access completely through the central opening of said body member is provided.

2. The apparatus according to claim 1 wherein one of said flanges on said body member includes a shoulder portion; a cylindrical cover member being slidably insertable over the other of said flanges and said coil and abuttingly engaging said shoulder portion of said one flange; said stop member including a portion extending radially outwardly of said other other flange such that said cover member is confined between said shoulder portion and said radially extending portion.

* * * * *

UNITED STATES PATENT OFFICE
CERTIFICATE OF CORRECTION

Patent No. 3,820,757    Dated June 28, 1974

Inventor(s)  John E. Siebel

It is certified that error appears in the above-identified patent and that said Letters Patent are hereby corrected as shown below:

[76] Inventor: John E. Siebel, 5563 W. Washington
               Blvd., Santa Monica, Calif.  90016 should read -

[76] Inventor: John E. Siebel, 5563 W. Washington
               Blvd., Los Angeles, Calif.  90016

Signed and sealed this 31st day of December 1974.

(SEAL)
Attest:

McCOY M. GIBSON JR.              C. MARSHALL DANN
Attesting Officer                Commissioner of Patents